US006783642B2

(12) United States Patent
Gueldry et al.

(10) Patent No.: US 6,783,642 B2
(45) Date of Patent: Aug. 31, 2004

(54) METHOD OF MAKING LABYRINTH SEAL LIPS FOR THE MOVING PARTS OF TURBOMACHINES

(75) Inventors: Gérard Gueldry, Vert Saint-Denis (FR); Claude Mons, Savigny-le-Temple (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/237,696

(22) Filed: Sep. 10, 2002

(65) Prior Publication Data

US 2003/0062256 A1 Apr. 3, 2003

(30) Foreign Application Priority Data

Sep. 11, 2001 (FR) ............................................. 01 11737

(51) Int. Cl.[7] ........................ C23C 14/34; H05H 1/24; B05C 3/00; B23K 1/19
(52) U.S. Cl. .............................. 204/192.2; 204/192.12; 427/331; 427/576; 228/268.31; 228/268.8
(58) Field of Search ......................... 204/192.12, 192.2; 427/576, 331; 228/262.31, 262.8, 268.31, 268.8

(56) References Cited

U.S. PATENT DOCUMENTS

| | | | |
|---|---|---|---|
| 3,339,933 A | 9/1967 | Foster | 277/53 |
| 3,975,165 A | 8/1976 | Elbert et al. | 29/182.2 |
| 4,148,494 A | 4/1979 | Zelahy et al. | 277/53 |
| 4,232,995 A | 11/1980 | Stalker et al. | 415/172 A |
| 4,386,112 A | 5/1983 | Eaton et al. | 427/34 |
| 5,223,332 A | 6/1993 | Quets | 428/216 |

FOREIGN PATENT DOCUMENTS

GB    2 310 897    9/1997

*Primary Examiner*—Steven Versteeg
(74) *Attorney, Agent, or Firm*—Oblon, Spivak, McClelland, Maier & Neustadt, P.C.

(57) ABSTRACT

In order to make labyrinth seal lips on the periphery of a metal moving part of a turbomachine, a thick layer of refractory material that adheres to the metal is made prior to assembling the moving part, the refractory material advantageously comprising at least one metal selected for example from Fe, Co, and Ni, together with at least one ceramic selected for example from borides, nitrides, carbides, and refractory oxides. The labyrinth seal lips that are to be made are machined to their final dimensions in the deposited thick layer.

17 Claims, 3 Drawing Sheets

METHOD OF MAKING LABYRINTH SEAL LIPS FOR THE MOVING PARTS OF TURBOMACHINES

BACKGROUND OF THE INVENTION

The invention relates to making labyrinth seal lips for the moving (rotary) parts of turbomachines, in particular for the rotors of gas turbine engines for aircraft.

In such gas turbines, the clearance between the radial ends of the moving parts and the facing stationary parts must be as small as possible in order to avoid lowering efficiency. This applies both between the tips and of the moving blades and a stationary ring surrounding them, and also between the periphery of a rotor and the tips of the stationary vanes situated around the rotor. In order to prevent gas flowing directly between the tips of the stationary vanes and the rotor, it is also known to form projecting annular portions on the periphery of the rotor that are referred to as "lips", at least some of which can define a tortuous path or labyrinth.

The small size of the clearance between the stationary parts and the moving parts, and also the variations in dimensions due to temperature changes, mean that the radial end portions of the moving parts can come into contact with the fixed parts. In order to avoid such contact or friction being damaging, it is known to coat the fixed parts with a so-called "abradable" material that is softer than the material of the radial end potions of the moving parts. Thus, if contact is made, then the end portions of the moving parts penetrate into the abradable material, wearing it away, thereby enabling some minimum clearance to be maintained between the fixed and moving parts. Abradable materials are based on metals, for example they can be based on nickel, cobalt, or iron, said metals being compatible with the material from which the fixed parts are made. Abradability can be obtained by conferring a certain amount of porosity to such materials.

Titanium is a material that is being used increasingly for making moving parts, in particular rotor parts in gas turbine engines for aircraft. High energy contacts between materials containing titanium and materials containing nickel, for example, lead to fragile eutectics being formed having low melting points and presenting a high degree of shrinkage on solidifying, which can lead to cracks being started. On propagating, such cracks can become transformed into fatigue cracks in the metal that can in turn lead to destruction of the moving parts.

That is why it is known to provide the end portions of titanium or titanium alloy moving parts with a protective coating to prevent direct contact being made between titanium and the abradable material of the stationary parts. Such a protective coating is generally of ceramic type, being abrasive in character, and is typically made of alumina. The coating is deposited on the end portions of the moving parts, in particular on the labyrinth seal lips of rotors, by thermal sputtering using a carrier gas at high speed, with the thickness of the coating generally being restricted to 0.1 millimeters (mm) or 0.2 mm.

For rotors that are made up of sections that are welded together like the rotor 1 in FIG. 1, the lips 2 and 2', and in particular the labyrinth seal lips 2, must be coated after the rotor has been assembled in order to prevent the coating being damaged during welding. Unfortunately, the shape of the labyrinth seal lips 2 and their offset location between the moving blades 3 at a distance from the welding connection plane 4, makes it very difficult or even practically impossible to achieve a completely satisfactory coating on both flanks of the lips, i.e. a coating that guarantees there will be no contact between the titanium of the material constituting the rotor 1 and the abradable material 5 fitted to the tips of the stationary vanes 6 facing the lips 2.

OBJECT AND SUMMARY OF THE INVENTION

An object of the invention is to provide a method of making labyrinth seal lips at the periphery of a metal moving part of a turbomachine, and particularly but not exclusively a part made essentially of titanium or titanium alloy, which method avoids the above-mentioned drawbacks of the prior art, in particular by making it possible to avoid any risk of contact and consequent eutectic formation between the metal material of the moving part and any abradable material carried by an adjacent stationary part, and to make this possible regardless of the shape and the location of the lips.

This object is achieved by the fact that prior to assembly of the moving part, a thick layer of refractory material that adheres to the metal is formed on the moving part, said refractory material containing at least a metal or a ceramic, and labyrinth seal lips are machined to their final dimensions in the thick layer of refractory material.

The refractory material is selected in such a manner as to be compatible with the metal of the moving part, i.e. to be capable of adhering to the surface of the metal and having a coefficient of thermal expansion that is close to that of the metal.

Naturally, the refractory material is also selected so as to avoid damaging eutectics being created by high energy contact with an abradable material. The refractory material therefore preferably does not include any titanium.

Particularly, but not exclusively, when the metal of the moving part is essentially titanium or titanium alloy, the refractory material preferably comprises a metal such as iron, nickel, or cobalt, together with a ceramic selected for example from borides, nitrides, carbides, and refractory oxides, and in particular at least one ceramic of abrasive nature, typically alumina, silicon or tungsten carbides, or boron nitrides.

The layer of refractory material is of a thickness selected to enable the labyrinth seal lips of the moving parts to be machined in said thickness. Prior to machining, the thickness of the layer that is formed is greater than 1 mm, typically lying in the range 3 mm to 8 mm.

The layer of refractory material is advantageously in the form of agglomerated powder or powder mixture. It can be formed by thermal sputtering, in particular by plasma deposition, or by brazing onto the metal.

The invention also provides a moving part forming a turbomachine rotor having labyrinth seal lips of the kind that can be obtained by the above-defined method, i.e. lips machined in a thick layer of refractory material.

BRIEF DESCRIPTION OF THE DRAWINGS

The invention will be better understood on reading the following description given by way of non-limiting indication and with reference to the accompanying drawings, in which.

DETAILED DESCRIPTION OF EMBODIMENTS OF THE INVENTION

Figure 1:
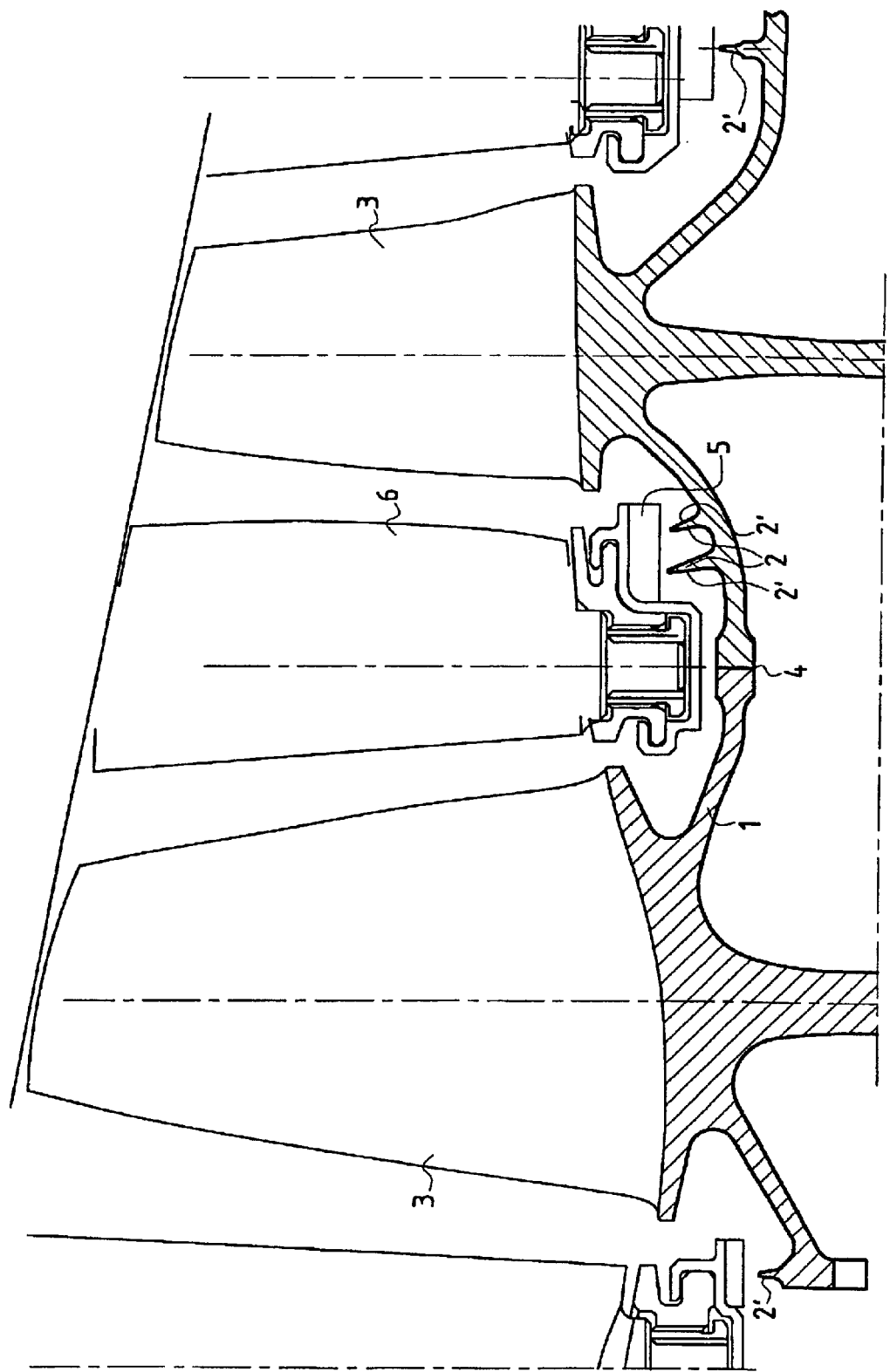
FIG. 1, as described above, is a fragmentary half-section view of a turbomachine section showing a rotor carrying prior art labyrinth seal lips.
Figure 2A:
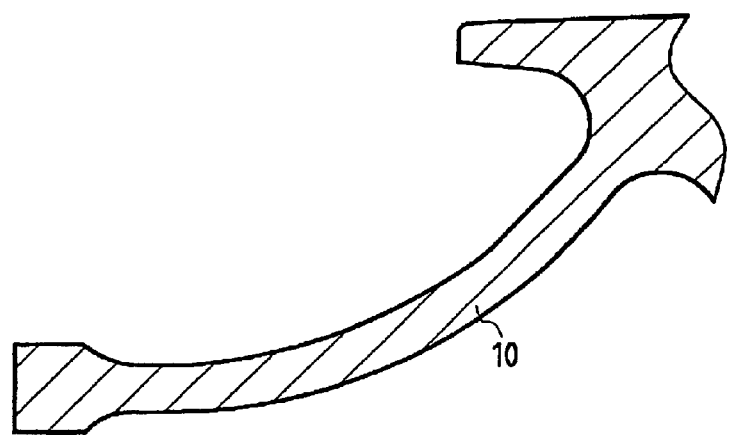
FIGS. 2A to 2C show successive steps in making labyrinth seal lips for a section of a turbomachine rotor in an implementation of the method of the invention.

FIG. 2A shows a portion of a turbomachine rotor 10, in particular of a rotor of a gas turbine engine for aircraft. By way of example, it comprises a portion of rotor section prior to being welded to one or more other sections to build up a welded rotor such as the rotor 1 of FIG. 1. The rotor portion 10 is designed to be placed facing the tips of stationary vanes provided with an abradable coating in the high-pressure compressor section of the turbomachine.

The rotor 10 is made of metal, for example essentially of titanium or titanium alloy.

Figure 2B:
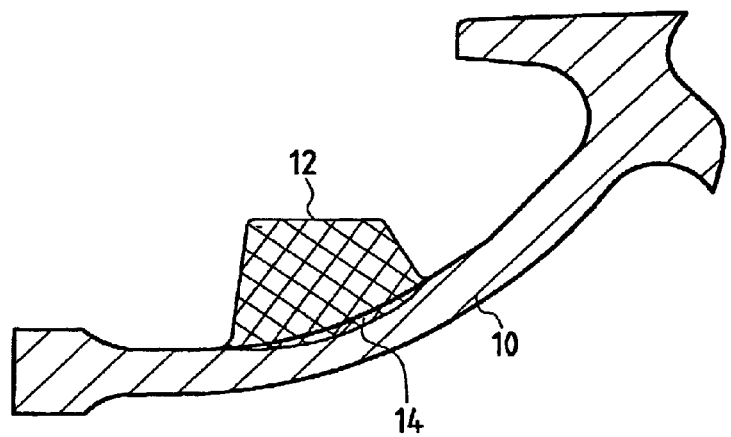

As shown in FIG. 2B, a thick layer 12 of refractory material is formed on the rotor portion 10.

The layer 12 is made of a material which is both compatible with the metal of the rotor 10 and is suitable for making lips, e.g. labyrinth seal lips suitable for coming into contact with an abradable material carried by the tips of stationary vanes situated facing the rotor portion 10 after assembly.

The refractory material advantageously comprises a material based on a metal that is preferably other than titanium, such as iron, cobalt, nickel, or an alloy thereof, together with at least one ceramic. The ceramic(s) is/are preferably selected amongst borides, nitrides, carbides, and refractory oxides in order to impart an abrasive nature to the material. Such an abrasive nature can be obtained by having alumina or silicon or tungsten carbide present in the material.

The table below lists typical compositions of nickel-based refractory material (given in percentages by weight) together with their Rockwell C hardnesses (HRc).

| Ni   | Cr | C    | B and Si | Fe  | HRc |
|------|----|------|----------|-----|-----|
| Base | 7  | 0.35 | 2 to 2.5 | 2.5 | 40  |
| Base | 12 | 0.55 | 2 to 2.5 | 2.5 | 50  |
| Base | 15 | 0.75 | 2 to 2.5 | 2.5 | 60  |

The layer 12 is formed by physical deposition, advantageously by thermal sputtering, using intimately mixed powders of the various components. Known plasma deposition methods such as pinched arc or partial pressure methods are suitable for this purpose. The powders are preferably of relatively small grain size, i.e. they have a mean particle size of less than 100 microns, and they are entrained by the gaseous plasma to the surface of the rotor portion 10. Relative rotary motion between the rotor portion 10 and the deposition apparatus enables an annular layer 12 to be formed over the entire periphery of the rotor portion 10.

As shown by reference 14 in FIG. 2B, the refractory material of the layer 12 diffuses locally into the metal material of the rotor portion 10, thereby ensuring that the layer 12 is bonded with a high level of adhesion.

Figure 2C:
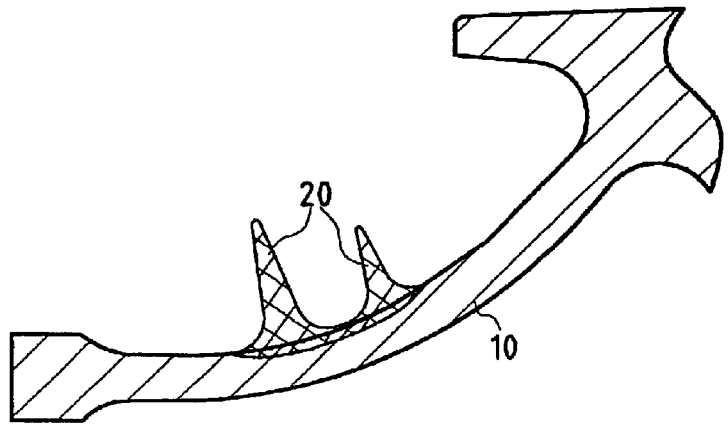

After the layer 12 has been deposited, it is machined so as to form lips 20 of accurate dimensions within the refractory material (FIG. 2C). The thickness of the refractory material is selected to be not less than the height of the lips, and even to be slightly greater than said height so that the tips are formed entirely out of the refractory material. As a result, it is not possible for there to be any contact in operation between the metal of the rotor portion 10 and an abradable material situated facing it.

The thickness of the layer 12 thus preferably lies in the range 2 mm to 8 mm, depending on the size desired for the lips. Typically, this thickness lies in the range 4 mm to 5 mm.

Figure 3:
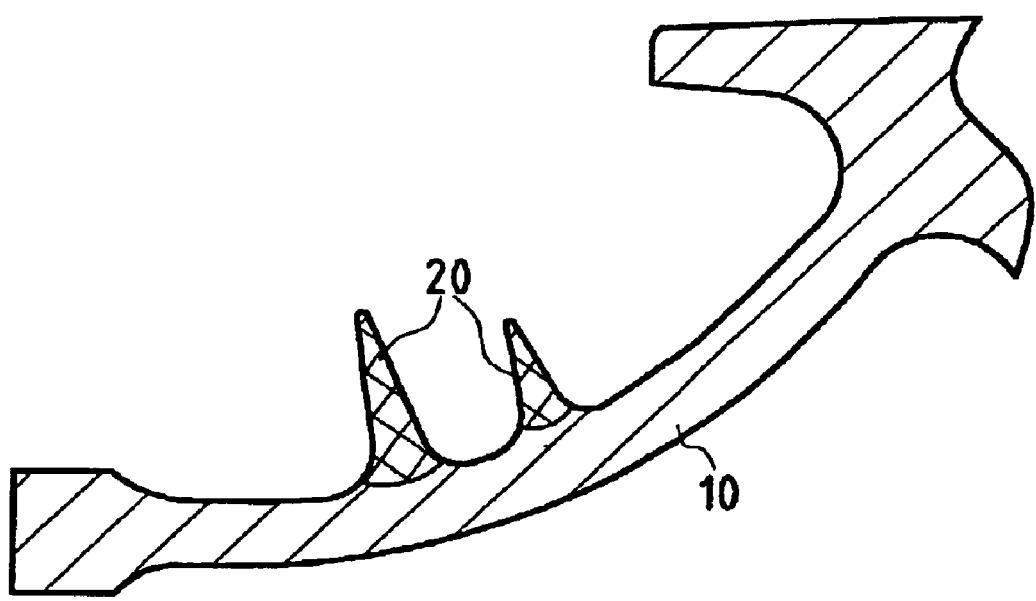
FIG. 3 shows a variant implementation of the method of FIGS. 2A to 2C.

It should be observed that the thickness of the layer of refractory material can be slightly smaller than the height of the lips 20, but with the lips nevertheless being made of refractory material over the major fraction of their height starting from their tips. Such a disposition is shown in FIG. 3;

Once the lips 20 have been machined, the rotor can be assembled. Since the lips are formed entirely (or almost entirely) out of refractory material, any welding operation performed on the rotor section carrying them will not damage them, as it would a thin coating.

What is claimed is:

1. A method of making labyrinth seal lips on the periphery of a metal moving part for a turbomachine, wherein, prior to assembly of the moving part, a thick layer of refractory material that adheres to the metal is formed on the moving part, said refractory material containing at least a metal and a ceramic, and labyrinth seal lips are machined to their final dimensions in the thick layer of refractory material.

2. A method according to claim 1, wherein the refractory material of the thick layer comprises at least one metal selected from the group consisting of iron, cobalt, and nickel, together with at least one ceramic.

3. A method according to claim 2, wherein the ceramic is selected from the group consisting of borides, nitrides, carbides, and refractory oxides.

4. A method according to claim 3, wherein the refractory material includes alumina.

5. A method according to claim 1, wherein the thickness of the layer of refractory material is greater than 1 mm.

6. A method according to claim 1, wherein the refractory material of the thick layer is in the form of an agglomerated powder or powder mixture.

7. A method according to claim 1, wherein the layer of refractory material is deposited by thermal sputtering.

8. A method according to claim 7, wherein the layer of refractory material is formed by plasma deposition.

9. A method according to claim 1, wherein the layer of refractory material is formed by brazing onto the metal.

10. A method of making labyrinth seal lips on a rotor of a turbomachine, the method comprising:

providing a rotor part before an assembly of said rotor;

depositing a layer of refractory material on a surface of said rotor part, said refractory material comprising at least a metal and a ceramic; and machining said labyrinth seal lips on said layer of refractory materials prior to said assembly.

11. The method of claim 10, wherein a thickness of said layer of refractory material is less than a height of said labyrinth seal lips.

12. The method of claim 11, wherein a major portion of said height of said labyrinth seal lips is made of said refractory material.

13. The method of claim 10, wherein a thickness of said layer of refractory material is greater than a height of said labyrinth seal lips.

14. The method of claim 10, wherein a height of said layer of refractory material is approximately between 2 mm and 8 mm.

15. The method of claim 10, wherein a powder to make said layer of refractory material has a mean particle size less than 100 $\mu$m.

16. The method of claim 10, wherein said depositing further comprises locally diffusing said layer of refractory material into a metal material of said rotor part.

17. The method of claim 10, wherein said layer of refractory material is a single layer.

* * * * *